Dec. 17, 1957  E. R. FLATZ ET AL  2,816,529
AIR COOLED INTERNAL COMBUSTION ENGINE
Filed April 25, 1955  3 Sheets-Sheet 1

INVENTORS:
Emil R. Flatz
Josef Hövel
Martin P. Roggendorff
By
Walter Becker
Patent Agent Dec. 17, 1957  E. R. FLATZ ET AL  2,816,529
AIR COOLED INTERNAL COMBUSTION ENGINE
Filed April 25, 1955  3 Sheets-Sheet 2

INVENTORS:
Emil R. Flatz
Josef Hövel
Martin P. Roggendorf
By
Patent Agent

United States Patent Office 2,816,529
Patented Dec. 17, 1957

2,816,529

AIR COOLED INTERNAL COMBUSTION ENGINE

Emil R. Flatz, Bergisch Gladbach, Josef Hövel, deceased, late of Koln-Dellbruck, by Margareta E. Hövel, executrix, Koln-Dellbruck, and Martin P. Roggendorff, Porz, Germany, assignors to Klockner-Humboldt-Deutz Aktiengesellschaft, Koln, Germany Application April 25, 1955, Serial No. 503,493

Claims priority, application Germany April 23, 1954

2 Claims. (Cl. 123—41.67)

The present invention relates to an air-cooled internal combustion engine and, more particularly, to an air-cooled slot-controlled two-stroke cycle internal combustion engine having a cylinder which is longitudinally displaceably arranged in an engine casing and is provided with a scavenging crank case pump, i. e. a pump partly formed by the crank case while the intake openings in the cylinder wall are controlled by the working piston.

It is an object of this invention further to improve the heretofore known internal combustion engines of this type.

It is another object of this invention to design an air-cooled slot-controlled two-stroke cycle internal combustion engine that can be provided with intake openings of larger cross section.

Still another object of this invention consists in the provision of an air-cooled slot-controlled two-stroke cycle internal combustion engine in which shortly after the release of the intake channels a relatively large intake cross section is released.

These and other objects and advantages of the invention will appear more clearly from the following specification in connection with the accompanying drawings in which.

Figure 6:
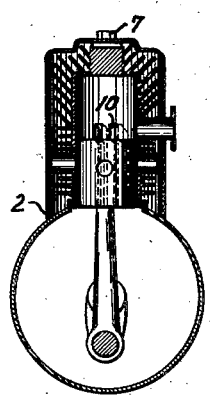

Fig. 6 diagrammatically illustrates a motor according to the invention on a considerably reduced scale while simultaneously indicating the crank case scavenging pump.

The primary feature according to the present invention consists in that the intake passages or slots lead into a gallery channel surrounding the cylinder. This arrangement makes it possible to provide the intake openings with large cross sections and also makes it possible to design the intake openings so that shortly after the intake openings or slots have been released a great intake cross section will be available and effective.

Figure 4:
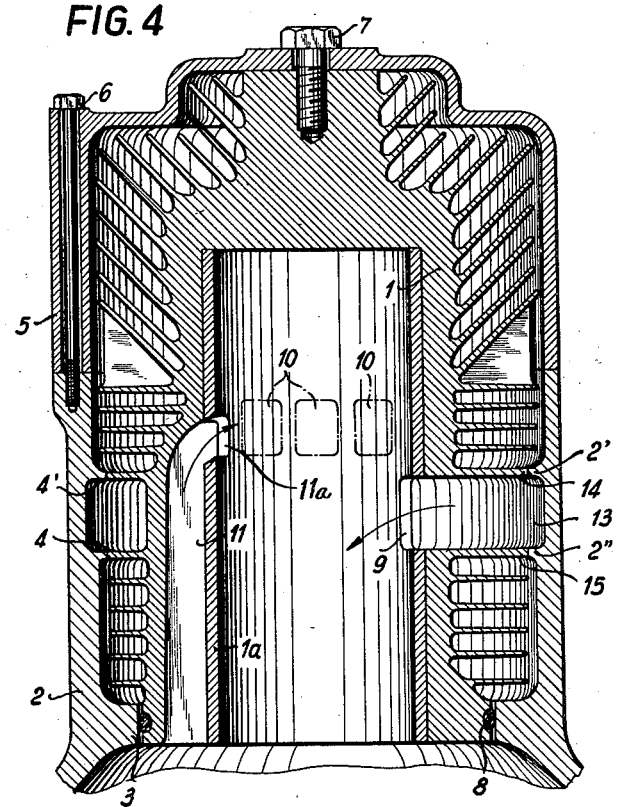
Fig. 4 is a longitudinal section through the cylinder of Fig. 1.
Figure 5:
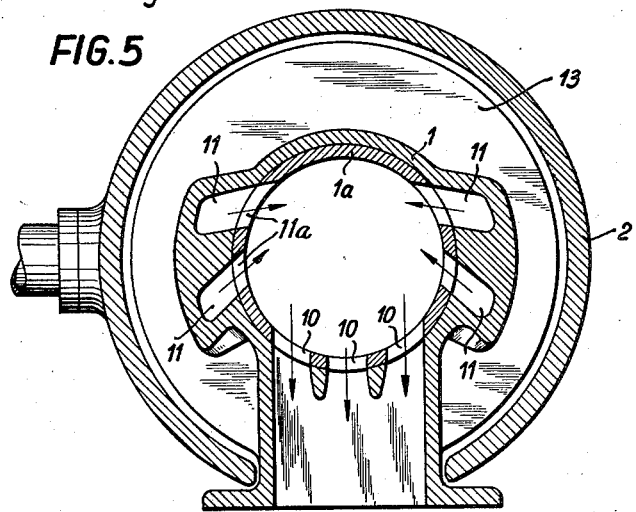
Fig. 5 is a cross section taken along the line V—V of Fig. 1.

Referring now to the drawings in detail, the cylinder 1 has fitted therein a liner 1a (Figs. 2, 4 and 5) and is longitudinally adjustable in an engine casing 2 surrounding said cylinder. The engine casing 2 serves for guiding the cooling air around the fin-equipped cylinder 1 in the manner of a cowl. As will be clearly seen from Fig. 4, the engine casing 2 has three fitting bores 3, 4, and 4' in which the cylinder 1 is guided, the bores 3, 4 and 4' preferably having the same diameter, as shown in Fig. 4. The upper end of the engine casing is located above the control passages or slots in a plane b—b. Mounted upon the engine casing 2 is a bell-shaped hood 5 covering the upper cylinder portion and connected to the engine casing 2 by means of bolts 6. The cylinder 1 is suspended on the hood 5 by means of screws 7, one only being shown. The lower end of the cylinder 1 is guided in the bore 3 while a rubber gasket 8 is interposed between the casing 2 and the cylinder 1 within the range of said bore.

Figure 1:
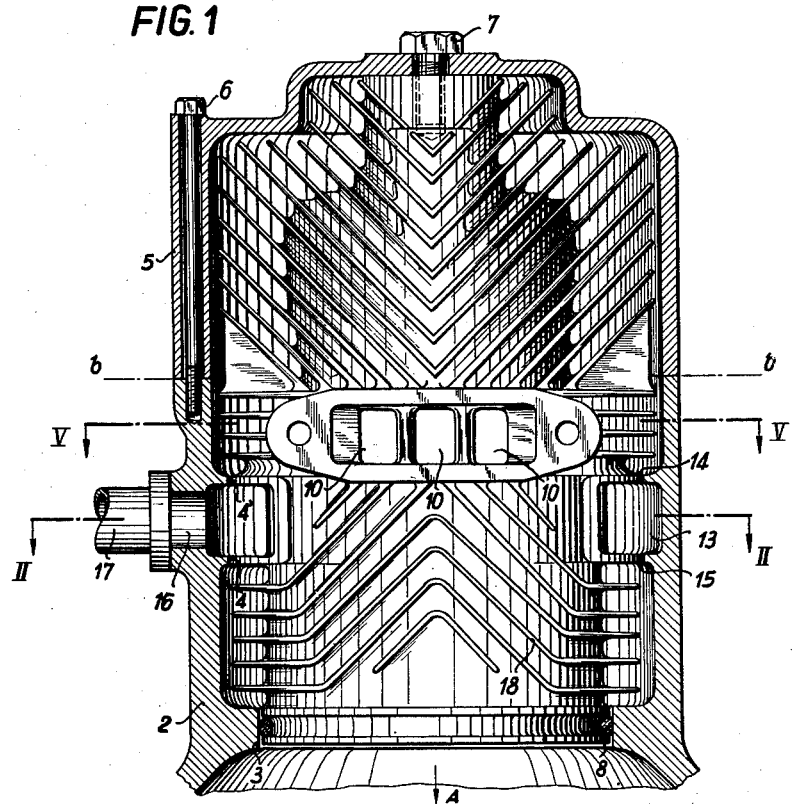
Fig. 1 illustrates a cylinder of an air-cooled slot-controlled two-stroke cycle internal combustion engine according to the invention as seen from the exhaust side thereof.
Figure 2:
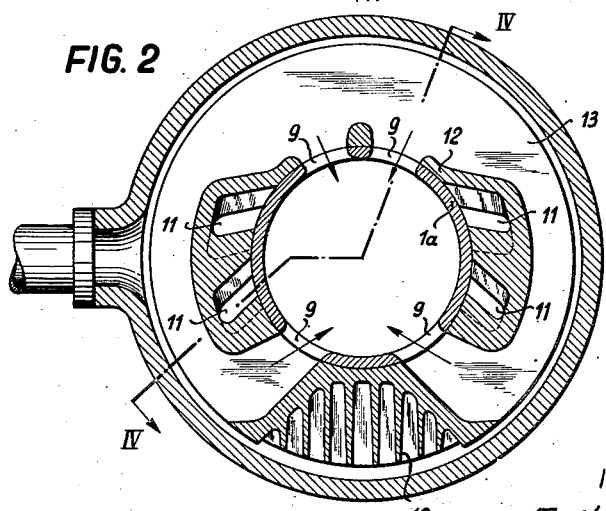
Fig. 2 is a cross section taken along the line II—II of Fig. 1.
Figure 3:
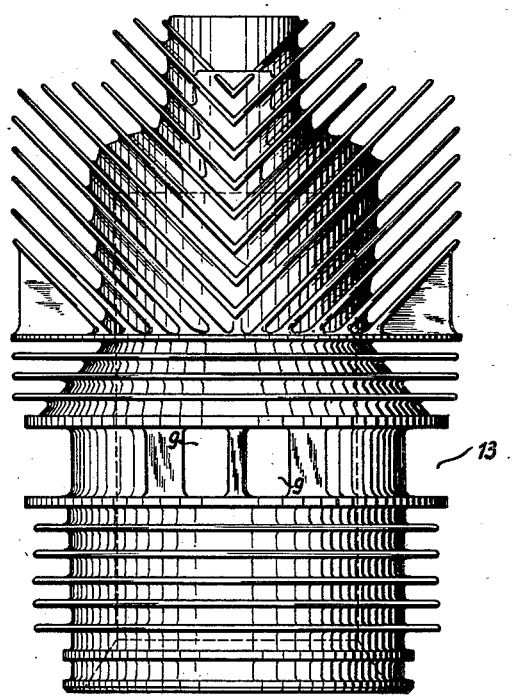
Fig. 3 shows a view of the cylinder according to the invention as seen in the direction of the arrow A of Fig. 2.

The two-stroke cycle internal combustion engine works with a scavenging crank case pump. The intake ports or slots 11a (Figs. 2 and 4) for scavenging air furnished by the scavenging pump to the cylinder are located in the cylinder wall and are controlled by the working piston. As will be clear from Fig. 4, the intake ports 11a are located at a level about the same level as the exhaust openings or slots 10. The exhaust openings 10 are arranged for unilateral reverse scavenging. The scavenging air conveying channels leading from the scavenging crank case pump to the intake ports 11a are designated with the reference numeral 11 and are clearly visible in Figs. 4 and 5. The engine is furthermore provided with intake openings 9 which extend through the cylinder wall 12 and lead into a gallery channel 13 surrounding the cylinder. These intake openings or slots 9 are located at a level lower than the lower edges of the exhaust slots 10. As will be evident from Fig. 2, in this way it is possible in an advantageous manner to provide four intake openings or slots 9. The gallery channel 13 is formed or confined by the engine casing 2 and two short circular flanges 2' and 2" respectively tightly engaged by radial flanges 14 and 15 of the cylinder 1. The intake connection or manifold 16 communicating with the gallery channel 13 is arranged in the engine casing as shown in Figs. 1 and 2. The connection 16 has connected thereto an intake filter 17. In order that the cooling of the cylinder will not be affected by the gallery channel 13 within the range of the discharge openings 10, the gallery channel is interrupted within the area of the discharge openings 10 so that cooling fins 18 below the discharge openings 10 can extend up to the latter.

It is, of course, understood that the present invention is, by no means, limited to the particular constructions shown in the drawings but also comprises any modifications within the scope of the appended claims. In particular, the invention is not limited to a certain type of two-stroke cycle internal combustion engines but is advantageously applicable to two-stroke cycle internal combustion engines working with an air-gas mixture to be compressed as well as to two-stroke cycle internal combustion engines working with fuel injection.

What we claim is:

1. In an air-cooled slot-controlled two-stroke cycle internal combustion engine having a crank case and a cylinder with scavenging air inlet ports, with discharge slots and with inlet slots for a gaseous medium: conduit means extending in substantially axial direction of said cylinder and arranged to effect communication between said crank case and said inlet ports for conveying scavenging air from said crank case into said cylinder, an engine casing, said cylinder being provided with radially extending flanges engaging adjacent portions of said casing and confining with said casing channel means extending around the major circumferential portion of said cylinder and on the outside of the outer wall of said scavenging air conveying conduit means for conveying a gaseous medium to said inlet slots, said channel means communicating with said inlet slots and having an inlet opening for connection with a supply source for a gaseous medium, and piston means reciprocable in said cylinder for controlling said scavenging air inlet ports and said inlet and discharge slots.

2. In an air-cooled slot-controlled two-stroke cycle internal combustion engine having a crank case and a cylinder with scavenging air inlet ports, with discharge slots and with inlet slots for a gaseous medium: conduit means extending in substantially axial direction of said cylinder and arranged to effect communication between said crank case and said inlet ports for conveying scavenging air from said crank case into said cylinder, an engine casing, said cylinder being provided with radially extending flanges engaging adjacent portions of said casing and confining with said casing channel means extending on the outside of the outer wall of said scavenging air conveying conduit means around said cylinder with the exception of the area comprising said discharge slots for conveying a gaseous medium to said inlet slots, said channel means communicating with said inlet slots and having an inlet opening for connection with a supply source for a gaseous medium, piston means reciprocable in said cylinder for controlling said scavenging air inlet ports and said inlet and discharge slots, and cooling fins connected to said cylinder and extending into the neighborhood of said discharge slots.

References Cited in the file of this patent

UNITED STATES PATENTS

| | | |
|---|---|---|
| 1,203,791 | Shickel | Nov. 7, 1916 |

FOREIGN PATENTS

| | | |
|---|---|---|
| 759,044 | France | Nov. 7, 1933 |
| 1,030,832 | France | Mar. 18, 1953 |

(Corresponding U. S. Patent 2,736,302, Feb. 28, 1956)